United States Patent [19]

Manico et al.

[11] Patent Number: 5,748,289
[45] Date of Patent: May 5, 1998

[54] APPARATUS AND METHOD FOR PRODUCING PHOTOGRAPHIC PRINTS WITH WRITE-ON BORDERS

[75] Inventors: Joseph Anthony Manico, Rochester; David Lynn Patton, Webster; Paul Henry Forest, Rochester, all of N.Y.

[73] Assignee: Eastman Kodak Company, Rochester, N.Y.

[21] Appl. No.: 705,468

[22] Filed: Aug. 29, 1996

[51] Int. Cl.⁶ .............. G03B 27/58; G03B 27/62
[52] U.S. Cl. .............. 355/74; 355/72; 355/75; 399/194
[58] Field of Search .............. 355/74, 50, 54, 355/77, 79, 112; 399/194

[56] References Cited

U.S. PATENT DOCUMENTS

| | | | |
|---|---|---|---|
| 4,154,526 | 5/1979 | Kostiner | 355/74 |
| 4,193,684 | 3/1980 | Armstrong | 355/40 |
| 4,469,438 | 9/1984 | Itikawa | 355/74 |
| 4,766,492 | 8/1988 | Miyawaki | 355/125 |
| 4,857,962 | 8/1989 | Satou | 355/29 |
| 4,896,186 | 1/1990 | Tokuda | 355/40 |
| 5,075,705 | 12/1991 | Harvey | 354/106 |
| 5,151,726 | 9/1992 | Iwashita et al. | 354/75 |
| 5,289,229 | 2/1994 | Manico et al. | 355/41 |
| 5,337,119 | 8/1994 | Tanibata | 355/40 |
| 5,365,308 | 11/1994 | Ozawa et al. | 355/74 |
| 5,383,035 | 1/1995 | Suzuki | 358/500 |

FOREIGN PATENT DOCUMENTS

| | | |
|---|---|---|
| 0 707 284 A2 | 9/1995 | European Pat. Off. . |
| 0 721 149 A2 | 6/1996 | European Pat. Off. . |
| 8029884-A | 2/1996 | Japan .............. G03B 27/46 |

*Primary Examiner*—Arthur T. Grimley
*Assistant Examiner*—Shival Virmani
*Attorney, Agent, or Firm*—Charles E. Snee, III; Gordon M. Stewart

[57] ABSTRACT

Apparatus for producing photographic prints (10) with write-on borders (14) from filmstrips (26, 46, 48, 58) having images (28-34, 38, 42) with varying orientation from image to image or from filmstrip to filmstrip or both, includes a mechanism (56, 60, 86) for intermittently conveying a filmstrip (58) through a filmstrip print gate (62); a system (80-86; 180-280) for determining an orientation of each image on the filmstrip to identify a top (18), bottom (16), left (20) or right (22) edge of each image; a controller (86) for selecting for at least some images on a filmstrip a common edge on which to provide a write-on border on at least one photographic print of each image; a system (72, 76, 86) for intermittently conveying a photographic paper strip (74) through a paper print gate (78); at the photographic paper print gate, a mechanism (88-94; 96-116; 118-148) for masking at least one edge of the paper print gate which corresponds to the selected common edge; and an illuminator (64) for each image at the filmstrip print gate to project each image onto a photographic paper at the paper print gate, so that at least some images printed on the photographic paper will have a write-on border along the selected common edge. A corresponding method is taught.

18 Claims, 11 Drawing Sheets

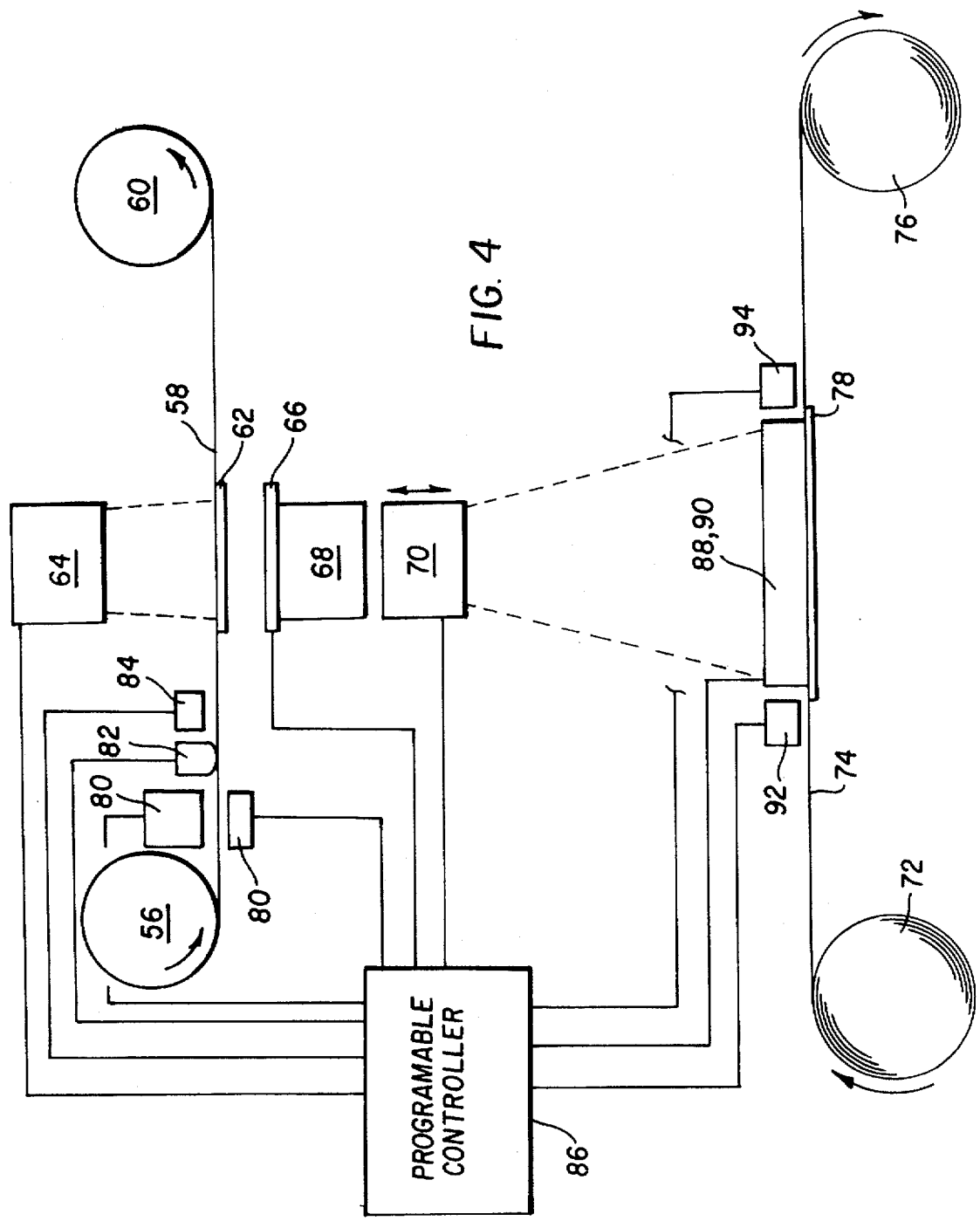

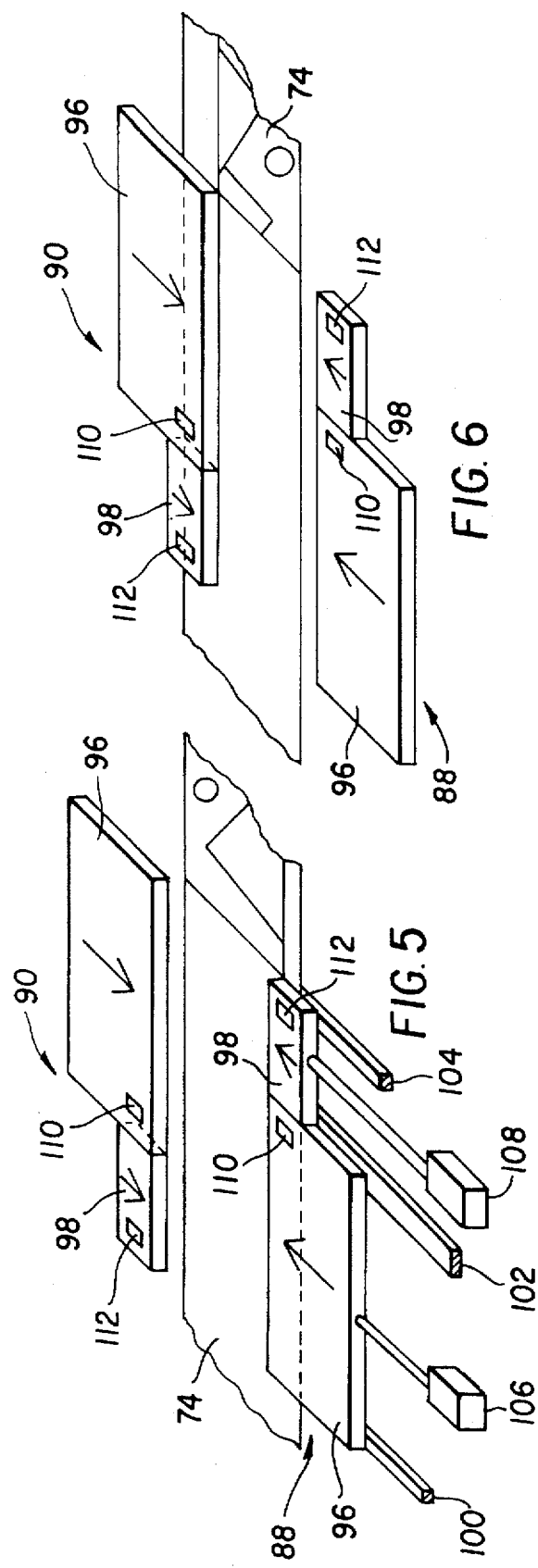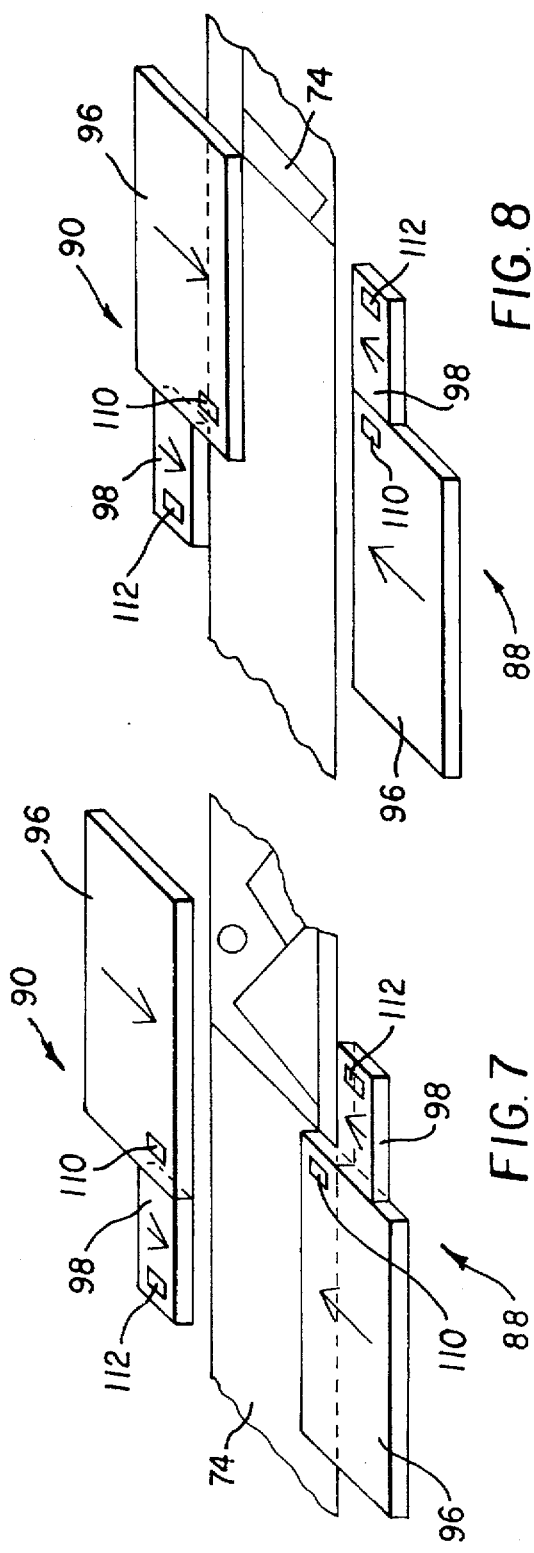

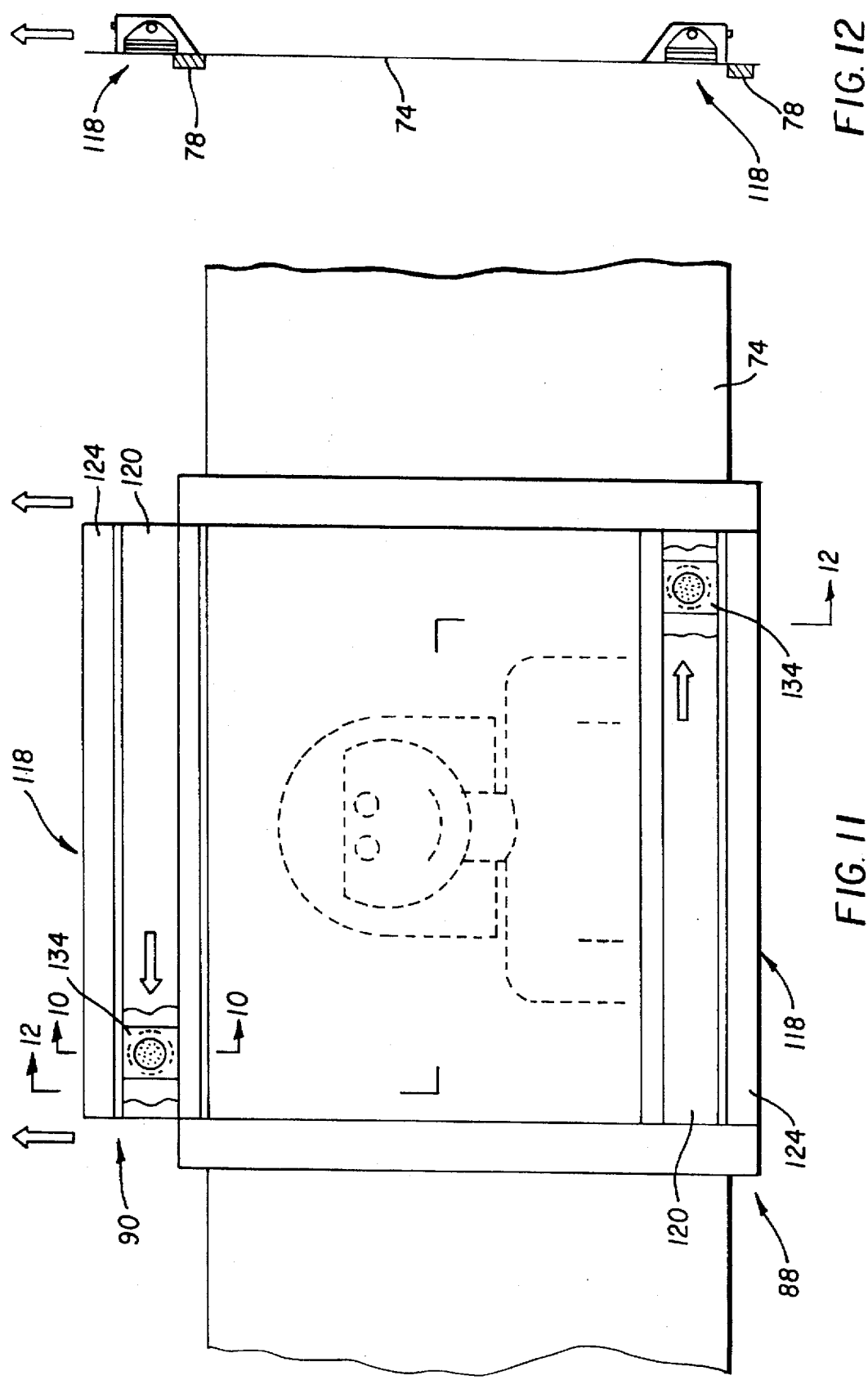

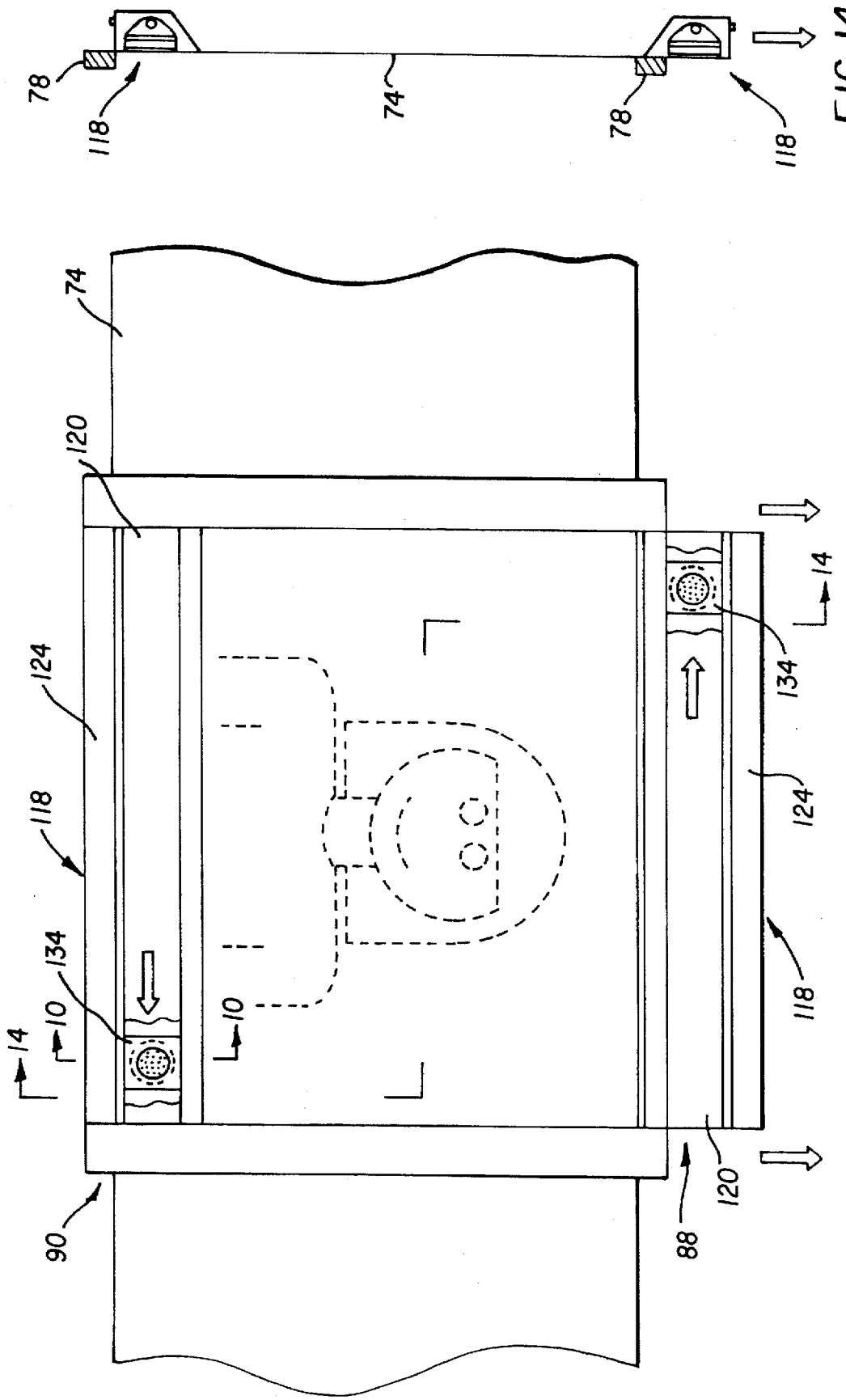

APPARATUS AND METHOD FOR PRODUCING PHOTOGRAPHIC PRINTS WITH WRITE-ON BORDERS

TECHNICAL FIELD

The invention relates to apparatus and methods for finishing photographic prints. More particularly, the invention concerns such apparatus and methods in which provision is made for providing a write-on border on the prints.

BACKGROUND OF THE INVENTION

Photographic prints have been available for many years with an unexposed, white border along one edge on which the customer can write information about the scene, the photographic conditions, or the like. An example of such a write-on print is shown in commonly assigned U.S. Pat. No. 5,075,705 and in FIG. 1 of the present specification. A write-on print 10 includes an image area 12 and, in a typical instance, a write-on border 12 along the bottom edge 16 of the print. The top edge 18, left edge 20 and right edge 22 usually have not been provided with write-on borders, though they could be. Within the write-on border, the customer can enter a text or message about the image.

A difficulty of providing write-on prints is that the images on a given filmstrip very often are not in the same orientation, as shown in FIG. 2 of the present specification. Thus, a processed filmstrip 26 may include an upright image 28, followed by an image 30 taken with the camera rotated clockwise, followed by an image 32 taken with the camera rotated counter-clockwise. The next image 34 may be of a scene for which a pseudo-panoramic print is desired, as indicated by the parallel dashed lines across the image. An optical or magnetic code 36 may be applied to the filmstrip in a known manner to signal a photofinisher that the image is to be cropped and enlarged to produce the desired panoramic print. Another image 38 may be of a scene for which a pseudo-telephoto print is desired, as indicated by the grid of dashed lines across the image. An optical or magnetic code 40 may be applied to the filmstrip to signal the photofinisher that the image is to be cropped and enlarged to produce the desired telephoto print. Or, an image 42 may have been exposed in panoramic or high definition television (HDTV) format by use of masks in the camera. An optical or magnetic code 44 may be applied to the filmstrip to signal the photofinisher to enlarge the image to produce the desired panoramic print. Alternatively, in the case of an image 42, the technique of commonly assigned U.S. Pat. No. 5,289,229 may be used to detect the presence of a panoramic or HDTV image. A technique for electronically scanning and then determining the orientation of successive images in a given filmstrip is disclosed in commonly assigned European Patent Application No. 0 707 284 A2 published Apr. 17, 1996, the contents of which are incorporated by reference into this application. Unless the photofinisher's equipment can determine the different orientations or formats, or both, of such images, simple masking of a fixed edge at a paper print plane in the printer will result in prints from a given filmstrip having write-on borders along a mix of top, bottom or side edges, an unacceptable result for most customers.

Another difficulty of providing write-on prints is that filmstrips may have been exposed in right-hand- or left-hand-load cameras. As shown in FIG. 3 of the present specification, a filmstrip 46 from a left-hand-load camera will present most of its images in an upright orientation when the film is fed in the direction of the arrow into the printer. In contrast, a filmstrip 48 from a right-hand-load camera will present most of its images in an inverted orientation when the film is fed in the same direction. In the familiar manner, such filmstrips are joined by a film splicing label 50 before they are processed; and the label remains with the filmstrips during subsequent printing from the developed negatives. To distinguish between filmstrips from left- and right-hand-load cameras, each label 50 may include a filmstrip or order number 52 and a code 54 to indicate the upright or inverted orientation of the following filmstrip. Such a technique, is disclosed in commonly assigned European patent application No. 0 721 149 A2 published Jul. 10, 1996, the contents of which are incorporated by reference into this application.

To most efficiently provide write-on borders on prints made from images of different orientations and formats, it would be desirable to be able to determine the origin of any image and then selectively mask during printing onto photographic paper; so that, write-on borders on all prints from a filmstrip would be positioned in the same orientation relative to their respective images. That is, all the borders would be along the bottom edge of the print, or the top edge, or a selected side edge. The present invention provides a technique for satisfying this desire.

SUMMARY OF THE INVENTION

A primary objective of the invention is to provide a method and apparatus for making photographic prints with write-on borders, in which the write-on borders of successive prints can be positioned in the same orientation relative to their respective images.

A further objective is to provide such a method and apparatus in which multiple prints of an image can be made, some with and some without write-on borders.

A further objective is to provide such a method and apparatus in which a logo or other information can be photographically printed in the write-on border.

Still another objective is to provide such a method and apparatus in which interspersed prints of different lengths can be provided with write-on borders in the same photofinishing order.

Yet another objective is to provide such a method and apparatus in which prints with and without write-on borders can be interspersed in the same photofinishing order.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The method and apparatus of our invention are particularly useful for producing photographic prints with write-on borders from filmstrips having images with varying orientation from image to image or from filmstrip to filmstrip or both. The method and apparatus may comprise steps of or means for: intermittently conveying a filmstrip through a filmstrip print gate; determining an orientation of each image on the filmstrip to identify a top, bottom, left or right edge of each image; selecting for at least some images on a film strip a common edge on which to provide a write-on border on at least one photographic print of each image; at a photographic paper print gate, masking an edge of the paper print gate which corresponds to the selected common edge; and illuminating each image at the filmstrip print gate to project each image onto a Photographic paper at the paper print gate. As a result, at least some images printed on the photographic paper will have a write-on border along the selected common edge. Of course, all images may be selected for write-on borders.

The invention may further comprise a step of or means for exposing a message, such as a logo, a date or other message, onto the photographic paper within the masked edge, whereby the message will appear on the write-on border. The message may be exposed by optical or digital means. Means may be included for positioning the means for exposing at various desired locations along the selected edge. When multiple prints are to be made of each image, the masking step may be omitted for at least one print of each image. The masking may extend completely along the selected common edge. The selected edge may extend parallel or transverse to a direction of conveying of the paper.

The means for masking may be movable out of engagement with the at least one edge. The means for masking may be pivoted or mounted for movement transverse to the at least one edge. The means for masking may be adjustable to accommodate images having different lengths along the common edge. The means for masking may comprise a first mask having a first length corresponding to a shorter length of the common edge; and a second mask having a second, incremental length, a combination of the first and second masks corresponding to a longer length of the common edge.

The invention provides various advantages. Write-on borders can be provided along a common, selected edge of successive prints, even if images in a filmstrip have different orientations within a filmstrip or from filmstrip to filmstrip. A message can be exposed in the write-on border at a desired location along the selected edge. Prints with and without write-on borders can be interspersed in the same photofinishing order. Write-on borders of different widths can be provided to accommodate prints of different sizes. Prints of different lengths can be provided with write-on borders in the same photofinishing order. The message to be exposed can be changed readily. These advantages can be provided without significant operator intervention.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 4 illustrates schematically a photographic printer apparatus having at the photographic paper gate several masks in accordance with the invention.

FIG. 5 illustrates schematically a perspective view of a pair of masks in position for masking a bottom edge of a panoramic print in a conventional orientation.

FIG. 6 illustrates schematically a perspective view of a pair of masks in position for masking a bottom edge of a panoramic print in an inverted orientation.

FIG. 7 illustrates schematically a perspective view of a single mask in position for masking a bottom edge of a normal print in a conventional orientation.

FIG. 8 illustrates schematically a perspective view of a single mask in position for masking a bottom edge of a normal print in an inverted orientation.

FIG. 11 illustrates schematically a plan view of a photographic paper gate flanked by a pair of edge mask assemblies, one mask assembly being advanced to mask a lower edge of a print in a conventional orientation and the opposite mask assembly being retracted.

FIG. 12 illustrates a view along line 12—12 of FIG. 11.

FIG. 13 illustrates schematically a plan view of a photographic paper gate flanked by a pair of edge mask assemblies, one mask assembly being advanced to mask a lower edge of a print in an inverted orientation and the opposite mask assembly being retracted.

FIG. 14 illustrates a view along line 14—14 of FIG. 13.

DESCRIPTION OF THE PREFERRED EMBODIMENTS

Figure 1:
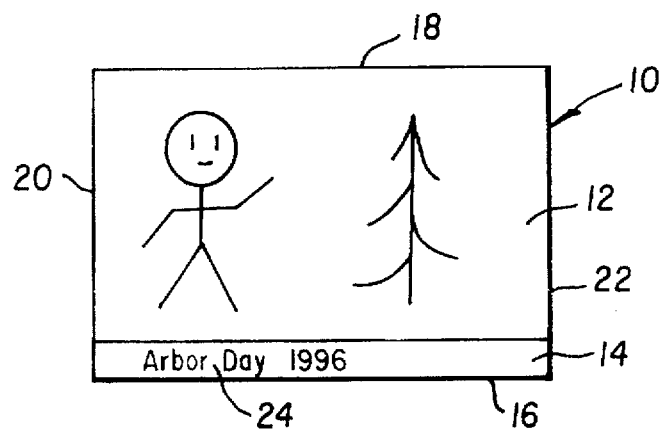
FIG. 1 illustrates schematically a photographic print with a write-on border along a bottom edge.
Figure 2:
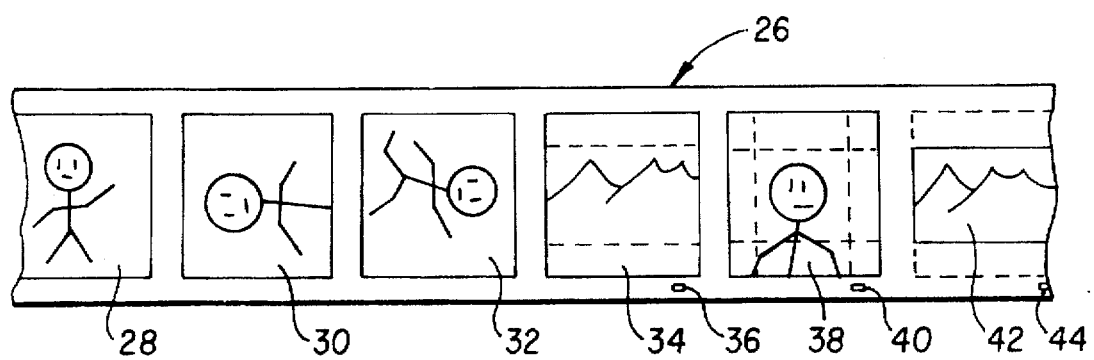
FIG. 2 illustrates schematically a developed filmstrip having images in varying orientations.
Figure 3:
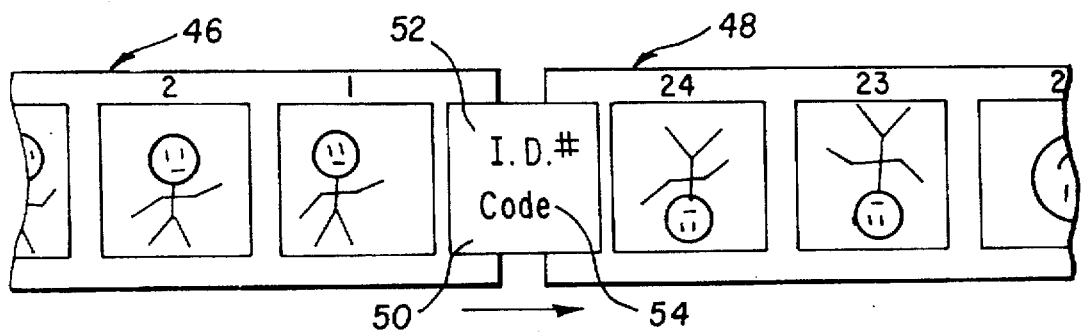
FIG. 3 illustrates schematically a developed filmstrip which was exposed in a left-hand-loaded camera and a developed filmstrip which was exposed in a right-hand-loaded camera, the filmstrips being joined by a splice label.

The following is a detailed description of the preferred embodiments of the invention, reference being made to the drawings in which the same reference numerals identify the same elements of structure in each of the several Figures.

FIG. 4 illustrates schematically a photographic printer embodying the invention. A supply reel 56 supports a wound strip made up of spliced, processed filmstrips 58. As the images on a filmstrip are sequentially exposed onto photographic paper, a take up reel 60 is rotated to wind up the spliced strip. Between the reels, a filmstrip print gate 62 flattens and supports each image on the filmstrip below an illumination source 64. Light from source 64 passes through the image, through an adjustable iris 66 and through a projection lens system including a fixed lens element 68 and a movable lens element 70. Below the lens system, a supply roll 72 of photographic paper is rotated to provide a continuous strip 74 of paper on which the images are to be exposed. A take roll 76 is rotated to wind up the exposed paper. Between the rolls of paper, a paper print gate 78 flattens and supports the paper during exposure. To determine proper exposure conditions for each image and, if appropriate, to help detect panoramic or HDTV images or to help determine the orientation of individual images, a conventional electronic scanner 80 may be included. To read information recorded magnetically on the filmstrip, a magnetic read head 82 may be included. Also, to read information recorded optically on the filmstrip, an optical read head 84 may be included. In the conventional manner, a programable controller 86 is connected to drive systems, not shown, for the filmstrip and paper and to scanner 80 and read heads 82, 84. Thus, in the familiar manner, each image is scanned and any associated magnetic or optical codes are read as the image moves to gate 62. The illumination system, iris and lens system are then adjusted as appropriate to expose the image properly onto the photographic paper.

As shown schematically in FIG. 4, to provide write-on borders in accordance with the invention, a pair of parallel edge masks 88, 90 are included, which extend longitudinally, parallel to the direction of movement of the paper, along opposite edges of the paper and print gate 78. Edge masks 92, 94 also may be included, which extend transverse to the direction of movement of the paper, along opposite, transverse edges of print gate 78.

Figure 9:
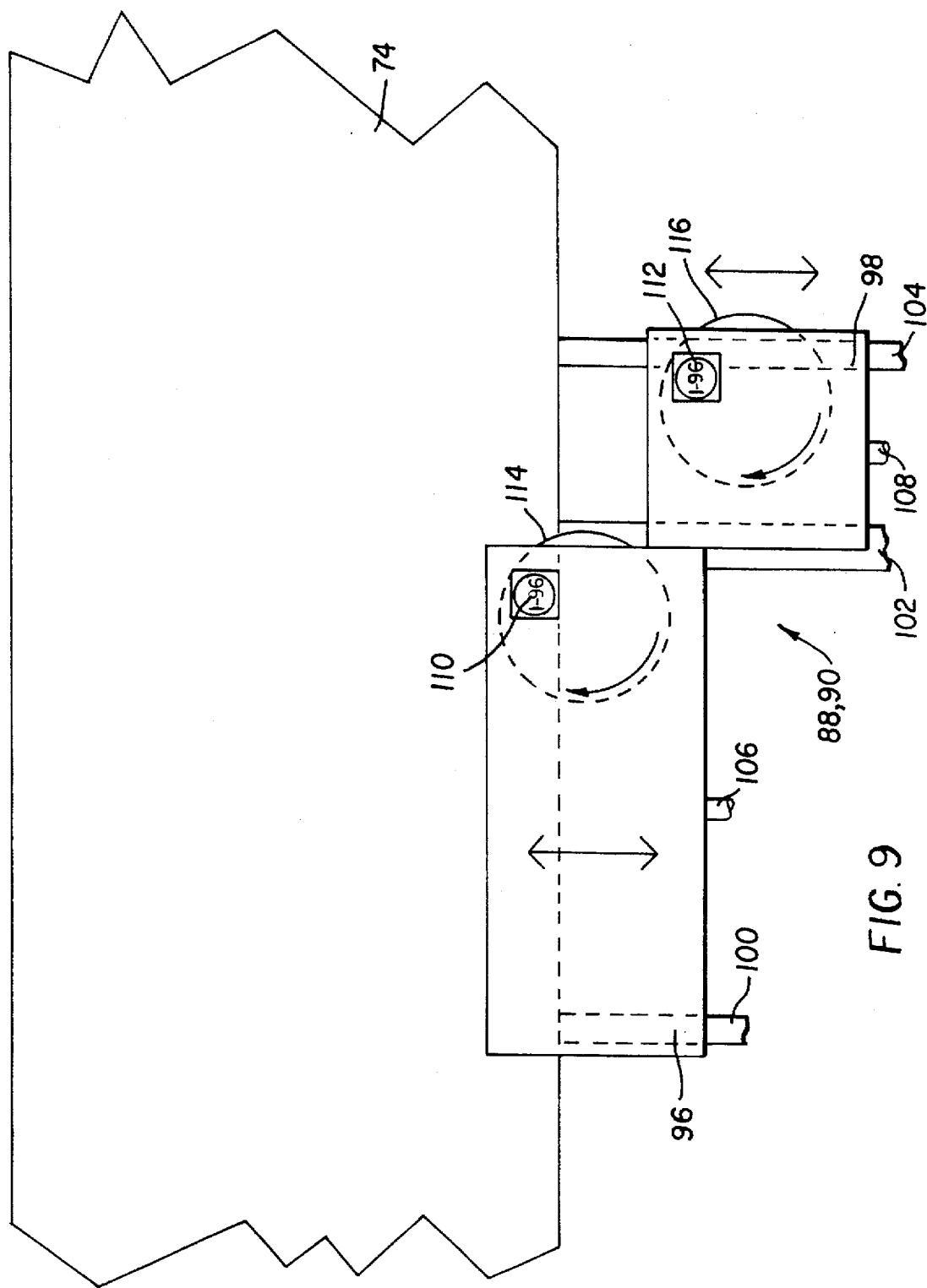
FIG. 9 illustrates schematically a plan view of a pair of individually movable masks, each mask having a rotatable disk with various information or logos to be printed in a write-on border.

FIGS. 5 to 8 illustrate schematically one embodiment of longitudinal edge masks 88, 90. However, those skilled in the art will appreciate that the illustrated structure also can be used for transverse edge masks 92, 94. Each of masks 88, 90 comprises a first, shorter length mask 96 and a second, incremental length mask 98. The length of mask 96, for example, may correspond to a long dimension of a conventional photographic print; whereas, the sum of the lengths of masks 96 and 98 may correspond to a long dimension of a panoramic or HDTV photographic print. Masks 96, 98 are supported for transverse movement on a set of guide rails 100, 102, 104, as shown schematically for one edge only in FIG. 5, it being understood that the same or similar arrangements would be included for the remaining edge or edges. A pair of linear actuators 106, 108 are included to move masks 96, 98 into and out of position for masking a border portion of each image printed onto paper 74. Depending on the size of the print to be made, actuators 106, 108 may advance the masks to provide wider or narrower write-on borders. Each mask may include a small message projector 110, 112 which may include a lithographic projection slide, for example, of a desired logo or message such as a date. An example of such a slide is disclosed in U.S. Pat. No. 4,193,684. The slide may be illuminated by source 64 or a separate light source, not shown, may be included on each mask, as will be discussed in greater detail with regard to FIGS. 10 to 14. The slide may be fixed or may be adjustable, such as rotatable disks 114, 116 shown in FIG. 9. Use of adjustable slides enables the operator to change the logo or message easily.

FIG. 5 shows a lower set of masks 96, 98 advanced together, as would be appropriate to provide a write-on border on a bottom edge of a panoramic or HDTV print when the image is oriented upward as viewed in FIG. 5. FIG. 6 shows an upper set of masks 96, 98 advanced together, as would be appropriate to provide a write-on border on a bottom edge of a panoramic or HDTV print when the image is inverted as viewed in FIG. 6. Similarly, FIG. 7 shows a lower mask 96 advanced to provide a write-on border on a bottom edge of a conventional print when the image is oriented upward, while lower mask 98 is retracted. FIG. 8 shows an upper mask 96 advanced to provide a write-on border on a bottom edge of a conventional print when the image is inverted, while upper mask 98 is retracted. During use, the orientation of each image is determined and the appropriate mask is advanced to provide a write-on border along the desired edge of the print.

Figure 19:
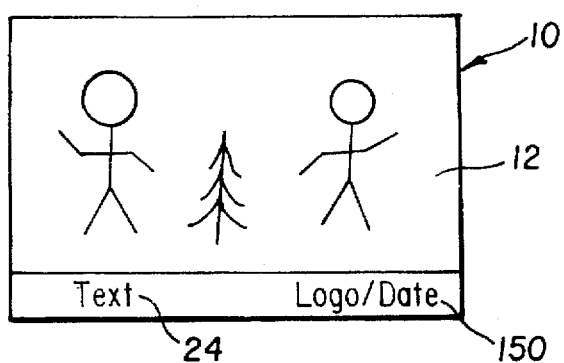
FIG. 19 illustrates schematically a photographic print with a write-on border of a type made in accordance with the invention.
Figure 10:
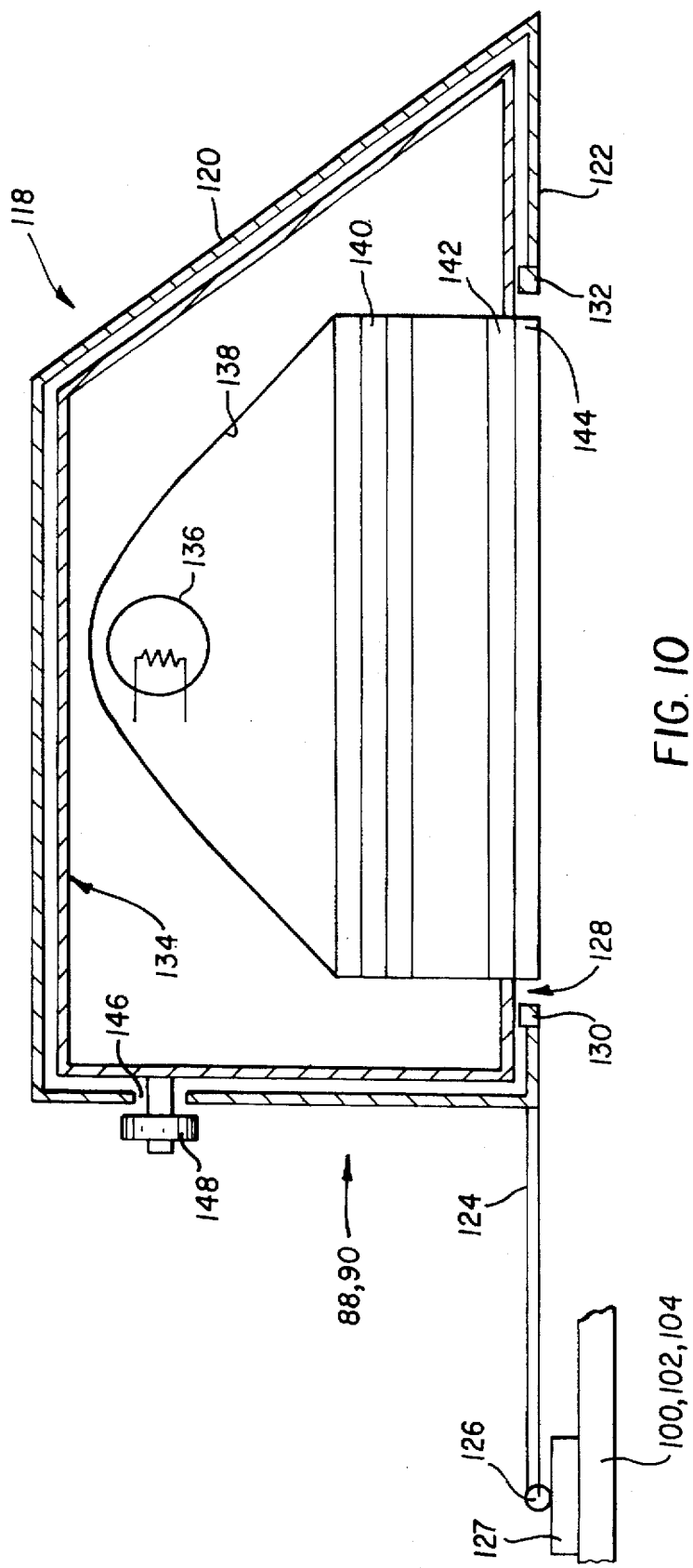
FIG. 10 illustrates schematically a sectional elevation view of an edge mask assembly in accordance with the invention, taken along lines 10—10 of FIGS. 11 and 13.
Figure 15:
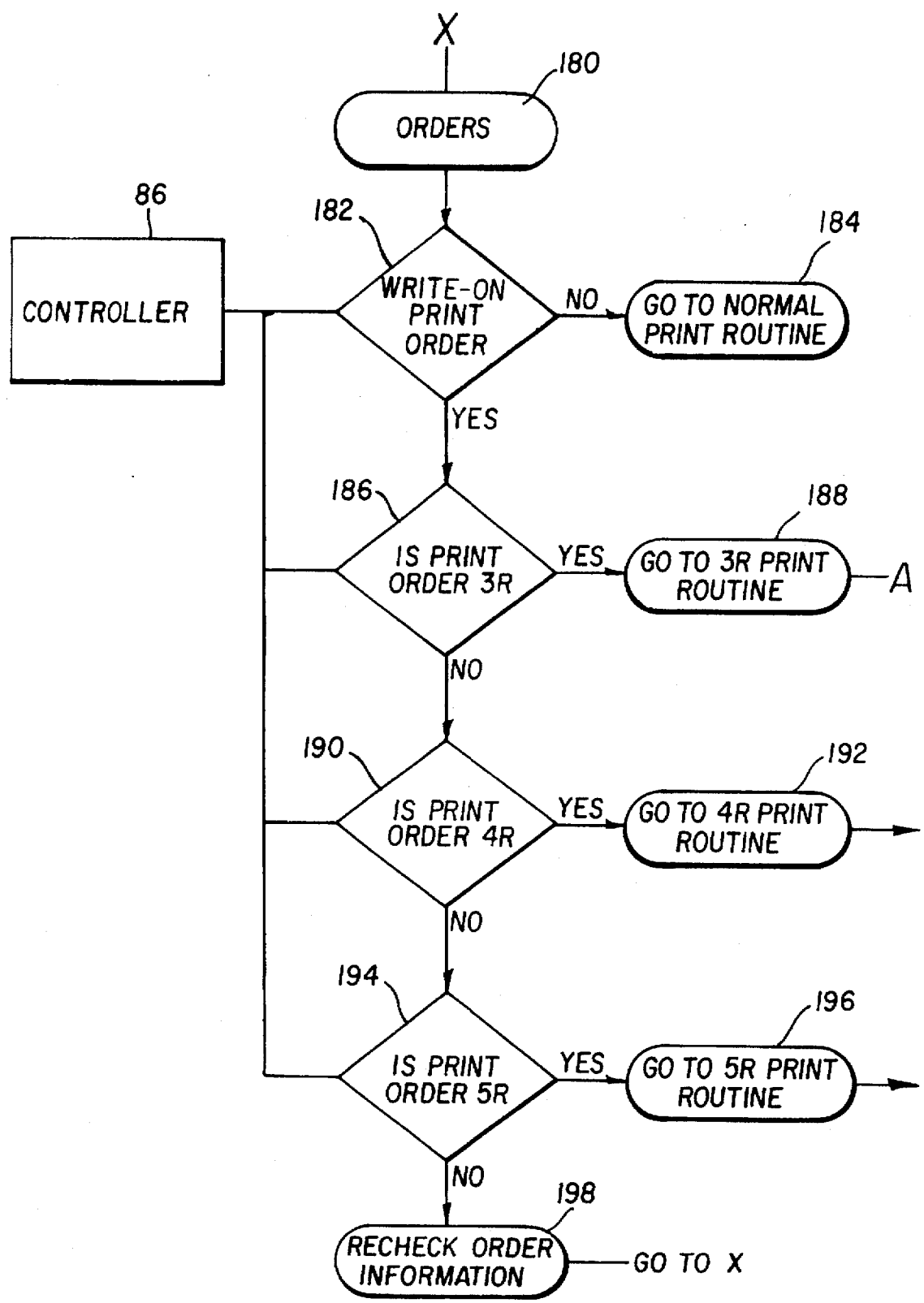
FIGS. 15 to 18 are flow charts illustrating various steps of the method of the invention.

FIG. 10 shows an elevation section view of an embodiment of an edge mask assembly 118 in accordance with the invention. Assembly 118 may be used for either or both of mask 88, 90 and 92, 94. An enclosed, opaque outer housing 120 has a bottom wall 122 from which extends a support arm 124 having a pivot mount or hinge 126 for attachment to adjacent structure of a photographic printer, not illustrated. Hinge 126 may be supported on a slider 127 which moves on rails 100 100, 102, 104, as shown schematically in FIG. 10, to enable the edge mask assembly to be moved linearly relative to the edge of the print, or to be pivoted toward and away from the print, or both. Housing 120 has a length sufficient to span each anticipated length or width of a print to be made. An elongated opening 128 is provided through bottom wall 122 and a pair of rails 130, 132 extend along opposite edges of opening 128. A closed illuminator housing 134 is slidably mounted on rails 130, 132 for movement along the length of the mask assembly. Within housing 134, a light source 136 is positioned before a reflector 138 to direct light through a conventional diffuser and filter pack 140 to a lithographic slide or other transparency 142 bearing a desired message, such as a logo or date, to be exposed onto the photographic paper. A lens plate 144 closes housing 134 and preferably is coplanar with an under surface of bottom wall 122. A slot 146 extends longitudinally through outer housing 120 to permit passage of an actuator knob 148 attached to illuminator housing 134. Thus, mask assembly 118 can be moved into position along an edge of an image and housing 134 may be selectively positioned along the length of mask assembly 118 by manually or otherwise moving knob 148 to a desired position. A message, logo or date thus may be provided at any desired position along the write-on border, as indicated at 150 in FIG. 19. By moving mask assembly 118 along rails 100, 102, 104, write-on borders of different widths can be provided.

FIGS. 11 and 12 illustrate how a lower mask assembly 118, as viewed in FIG. 11, is advanced over an edge of paper 74 when an image is oriented upward. The opposite mask assembly is retracted. Similarly, FIGS. 13 and 14 illustrate how an upper mask assembly 118, as viewed in FIG. 13, is advanced over an opposite edge of paper 74 when an image is inverted. Again, the opposite mask assembly is retracted.

FIGS. 15 to 18 are flow charts showing the method of operation of a photographic printer embodying the invention. At step 180, the photofinisher inputs information to the system concerning whether a given original order or a reorder is to have write-on prints and the size of the prints to be produced, such as the familiar 3R (4×5 inch; 101.6× 127 mm), 4R (4×6 inch; 101.6×152.4 mm) or 5R (5×7 inch; 127×177.8 mm). In the case of reorder prints using the Universal Reorder System (URS) or Kodak Reorder System (KRS), information regarding write-on prints may be provided by a computer disk for URS or by a punch code tape attached to the reorder negatives for KRS. If no write-on prints are requested, the system proceeds to a normal print routine at step 184. If write-on prints are requested, the system proceeds to a 3R, 4R or 5R print routine. At steps 186, 188; 196, 192; or 194, 196. If the print size has not been specified, the system returns at step 198 to step 180.

Figure 16:
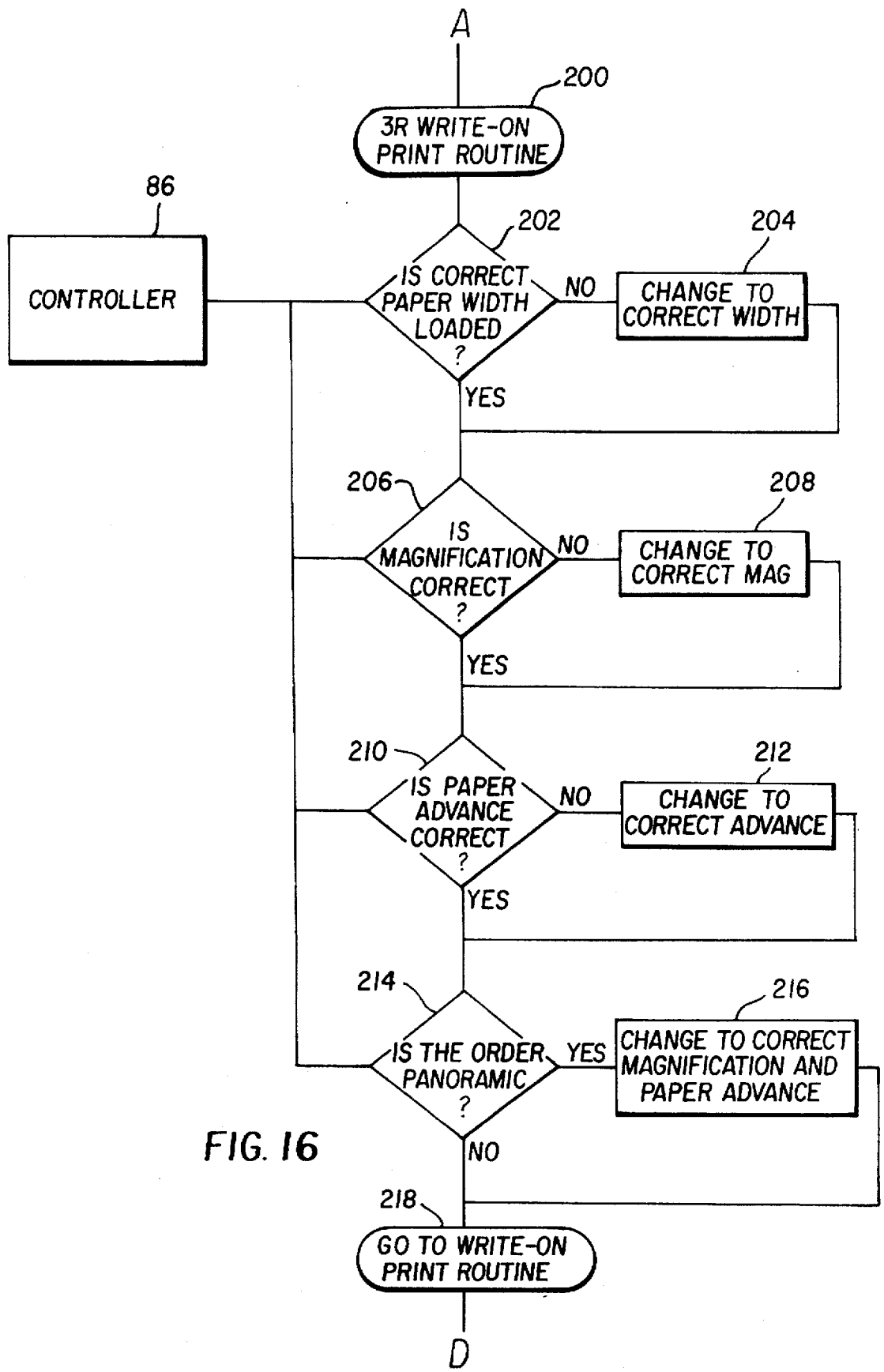

FIG. 16 shows the print routine for 3R prints, those for 4R and 5R being substantially identical. Instruction for 3R prints is received at step 200 and paper width is checked at step 202. If the incorrect paper is present, a change is made at step 204. If the correct paper is present, the magnification setting of the lens system is checked at step 206. If the magnification is not correct, a change is made at step 208. If the magnification is correct, the status of the paper advance system is checked at step 210. If the advance system is not correct, a change is made at step 212. If the advance system is correct, the print order is checked at step 214 to see if all panoramic prints are requested. If all panoramic prints are requested, the paper advance and magnification are adjusted at step 216. The system then proceeds to a write-on print routine at step 218.

Figure 17:
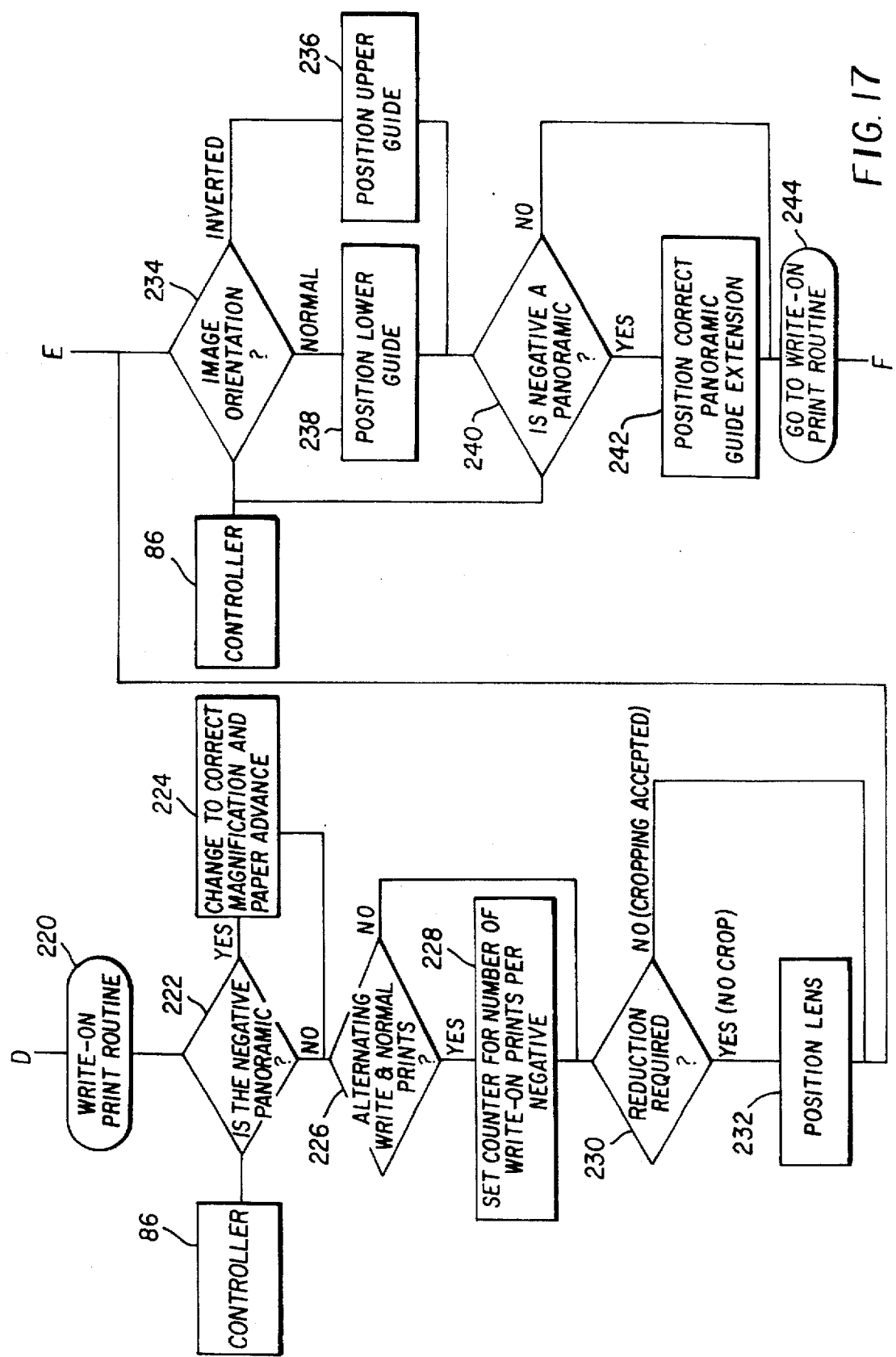

FIG. 17 shows the write-on print routine. Instruction for write-on prints in received at step 220. At step 222, a determination is made of whether or not the negative is panoramic, such as images 34 or 42. If the negative is panoramic, the magnification and paper advance are set at step 224 before proceeding. After Steps 222 or 224, a step may be included, not illustrated, to determine whether or not a write-on print should be made for a specific negative in a write-on print order. At step 226, a determination is made of whether or not alternating normal and write-on prints are desired. If not, the system proceeds to step 230. If alternating prints are desired, a counter is set in step 228 for the number of write-on prints per negative. In step 230, a determination is made of whether or not reduction of the printed image is required to avoid cropping of the image when a write-on border is provided. If no reduction is needed, the system proceeds to step 234. If reduction is needed to avoid cropping, the magnification is adjusted before proceeding to step 234. The orientation of the image is checked at step 234, using information for each image as obtained from scanner 80 or reader heads 82, 84, or both. If the image is inverted, the upper mask is advanced or pivoted into position at step 236; if the image is upright, the lower mask is advanced or pivoted into position at step 238. As indicated previously, "upper" and "lower" refer to the positions of the masks as seen in FIGS. 5 to 8, 11 and 13. In step 240, a determination is made of whether or not the image is panoramic. If a panoramic image is being printed, the appropriate mask 98 is advanced at step 242.

Figure 18:
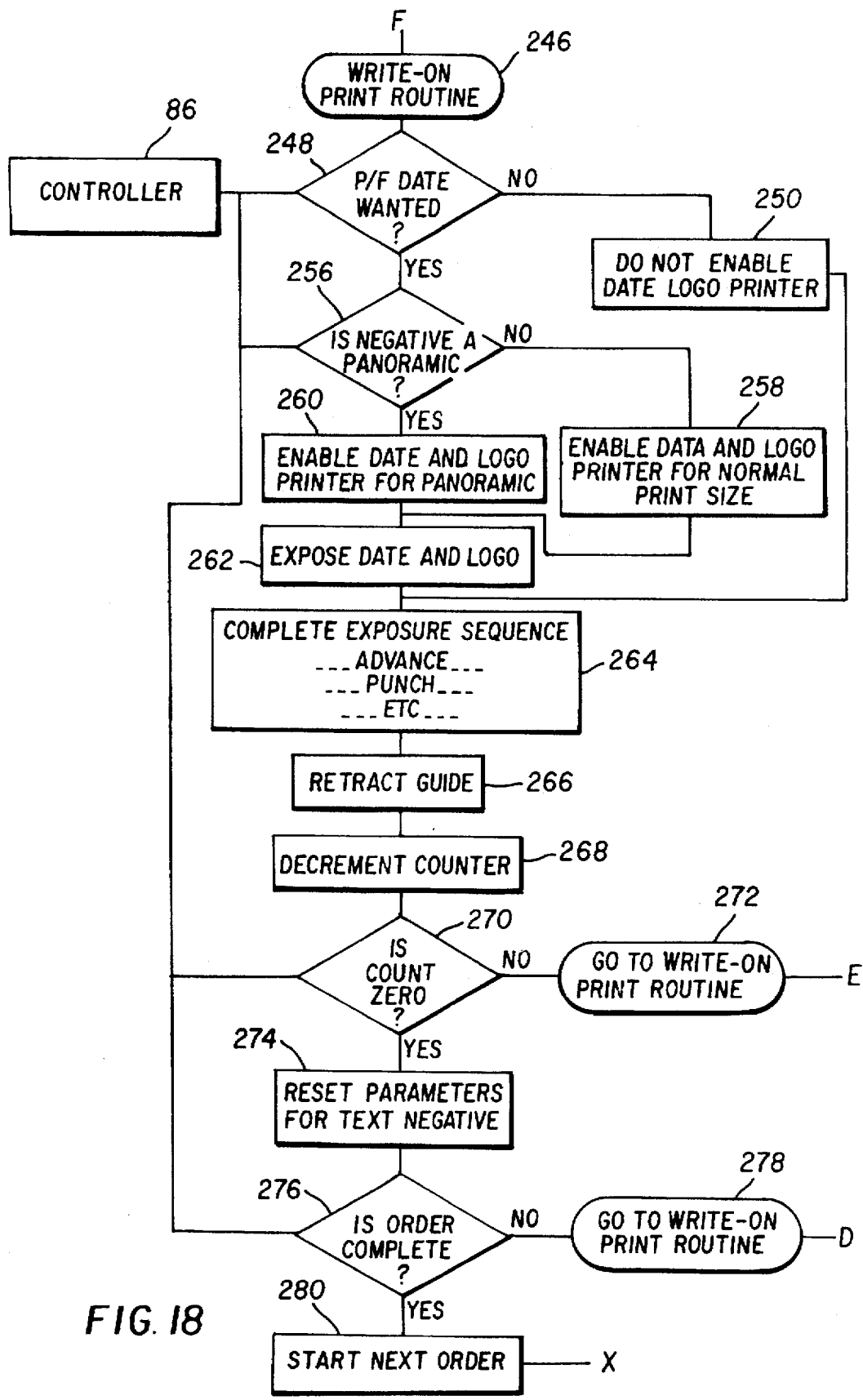

The system proceeds with the write-on print routine at steps 244, 246. In FIG. 18 at step 248, a determination is made of whether or not the date of photofinishing is desired in the write-on border. Of course, other messages or a logo could be provided in addition to, or in place of, the date. If no message is desired, the logo or message projectors or printers are disabled at step 250. If a message is desired, a determination is made at step 256 of whether or not the image panoramic. If the image is not panoramic, message projector 110 is activated at step 258 for normal sized prints in the embodiment of FIGS. 5 to 8; or housing 134 is moved to the proper position for normal prints in the embodiment of FIGS. 11 to 14. If the image is panoramic, message projector 112 is activated at step 260 for panoramic prints in the embodiment of FIGS. 5 to 8; or housing 134 is moved to the proper position for panoramic prints in the embodiment of FIGS. 11 to 14. At step 260, the message or logo is exposed onto the photographic paper within the write-on border.

The remainder of the conventional exposure sequence is then completed at step 264, after which the masks are retracted or pivoted out of position at step 266 and the counter is decremented at step 268. If the count is not zero at step 270, the system returns at step 272 to step 234 to prepare the next write-on print of the same image. If the count is zero, the system resets at step 274 for the next negative. At step 276, a determination is made of whether or not the order is complete. If not, the system returns at step 278 to step 220 for the next negative.

If the order is complete, the system returns at step 280 to step 180 for the next order.

Parts List

10 ... photographic print
12 ... image area
14 ... write-on border
16 ... bottom edge
18 ... top edge
20 ... left edge
22 ... right edge
24 ... text message
26 ... processed film strip
28 ... upright image
30 ... image with camera rotated clockwise
32 ... image with camera rotated counterclockwise
34 ... image for pseudo-panoramic print -continued Parts List 36 ... code to print pseudo-panoramic
38 ... image for pseudo-telephoto print
40 ... code to print pseudo-telephoto
42 ... panoramic image masked in camera
44 ... code to print panoramic
46 ... filmstrip from left-hand load camera
48 ... filmstrip from right-hand load camera
50 ... film splicing label
52 ... filmstrip or order ID number
54 ... code to indicate trailing filmstrip is upright or inverted
56 ... supply reel of spliced, processed filmstrips
58 ... film strip
60 ... takeup reel
62 ... filmstrip print gate
64 ... illumination source
66 ... adjustable iris
68 ... fixed lens element
70 ... movable lens element
72 ... supply roll of photographic paper
74 ... strip of photographic paper
76 ... takeup roll
78 ... paper print gate
80 ... electronic scanner
82 ... magnetic read head
84 ... optical read head
86 ... programable controller
88, 90 ... edge masks parallel to direction of movement of paper
92, 94 ... edge masks transverse to direction of movement of paper
96 ... first, shorter length mask
98 ... second, incremental length mask
100, 102, 104 ... guide rails
106, 108 ... linear actuators
110, 112 ... logo/date projector
114, 116 ... rotatable disks of logos
118 ... edge mask assembly
120 ... light-tight outer housing
122 ... bottom wall
124 ... support arm
126 ... pivot mount
127 ... slide
128 ... longitudinal opening
130, 132 ... longitudinal rails
134 ... closed illuminator housing
136 ... light source
138 ... reflector
140 ... diffuser and filter pack
142 ... slide with logo/date
144 ... lens plate
146 ... longitudinal slot in 120
148 ... positioning knob
150 ... logo/date on print
180–280 ... method steps While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A method for producing photographic prints with write-on borders from filmstrips having images with varying orientation from image to image or from filmstrip to filmstrip or both, comprising the steps of:

(a) intermittently conveying a filmstrip through a filmstrip print gate;

(b) determining an orientation of an image on the filmstrip for which a photographic print is to be made with a write-on border;

(c) in response to determining the orientation of the image, selecting an edge of the image upon which to provide a write-on border on a photographic print to be made of the image;

(d) at a photographic paper print gate, selectively masking an edge of the paper print gate which corresponds to the selected edge in step (c); and illuminating the image at the filmstrip print gate to project the image onto a photographic paper at the paper print gate to expose said paper to said image while masking said one edge to block block exposure of said edge to said image whereby the photographic paper will have a write-on border along only the selected edge.

2. A method according to claim 1, further comprising a step of exposing a message onto the photographic paper within the masked edge, whereby the message will appear on the write-on border.

3. A method according to claim 1, wherein multiple prints are to be made of the image and the masking step is omitted for at least one print of the image.

4. A method according to claim 1, wherein the masking extends completely along the selected edge.

5. A method according to claim 1, wherein the selected edge extends parallel to a direction of conveying of the filmstrip.

6. A method according to claim 1, wherein the selected edge extends transverse to a direction of conveying of the filmstrip.

7. Apparatus for producing photographic prints with write-on borders from filmstrips having images with varying orientation from image to image or from filmstrip to filmstrip or both, comprising:

a film strip print gate;

a film drive that intermittently conveys a filmstrip through the filmstrip print gate;

a control device that determines an orientation of an image on the filmstrip and which selects, in response to the determination of the image orientation, a write-on border on one edge of at least one photographic print to be made from the image;

a paper print gate;

a paper drive that intermittently conveys a photographic paper strip through the paper print gate;

a masking device located at the photographic paper print gate, which masking device can selectively mask an edge of the paper print gate which corresponds to the selected edge; and a projection device that illuminates the image at the filmstrip print gate to project the image onto a photographic paper at the paper print gate to expose the paper to the image while the masking device masks the one edge to block exposure of said edge to said image, whereby an image printed on the photographic paper will have a write-on border along the selected edge.

8. Apparatus according to claim 7, further comprising means for exposing a message onto the photographic paper within the masked edge, whereby the message will appear on the write-on border.

9. Apparatus according to claim 7, wherein the means for masking is movable out of engagement with the at least one edge.

10. Apparatus according to claim 7, wherein the masking device is pivoted to move out of engagement with the selected edge.

11. Apparatus according to claim 7, wherein the masking device moves transversely to the selected edge.

12. Apparatus according to claim 7, wherein the masking device extends completely along the selected edge.

13. Apparatus according to claim 7, wherein the masking device is adjustable to accommodate images having different lengths along the selected edge.

14. Apparatus according to claim 13, wherein the masking device comprises a first mask having a first length corresponding to a shorter length of the selected edge; and a second mask having a second, incremental length, a combination of the first and second masks corresponding to a longer length of the selected edge.

15. Apparatus according to claim 14, further comprising means on both the first and second masks for exposing a message onto the photographic paper within the masked edge, whereby the message will appear on the write-on border for both the shorter and the longer lengths.

16. Apparatus according to claim 7, wherein the selected edge extends parallel to a direction of conveying of the paper.

17. Apparatus according to claim 7, wherein the selected edge extends transverse to a direction of conveying of the paper.

18. Apparatus according to claim 7, further comprising:

means for exposing a message onto the photographic paper within the masked edge, whereby the message will appear on the write-on border; and means for positioning the means for exposing at a desired location along the selected masked edge.

\* \* \* \* \*